E. F. EDGECOMBE.
TREAD FOR RESILIENT TIRES.
APPLICATION FILED JULY 9, 1914.
1,113,934.
Patented Oct. 13, 1914.
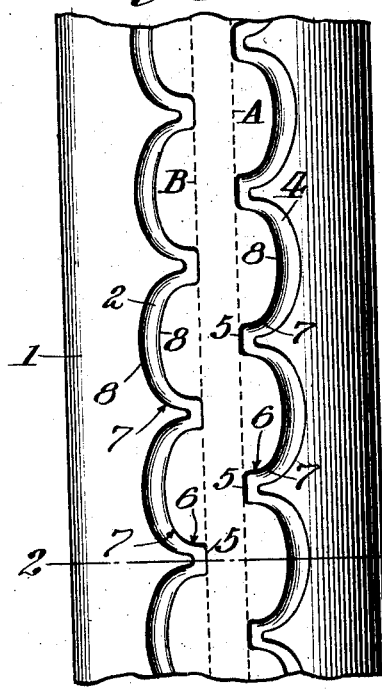
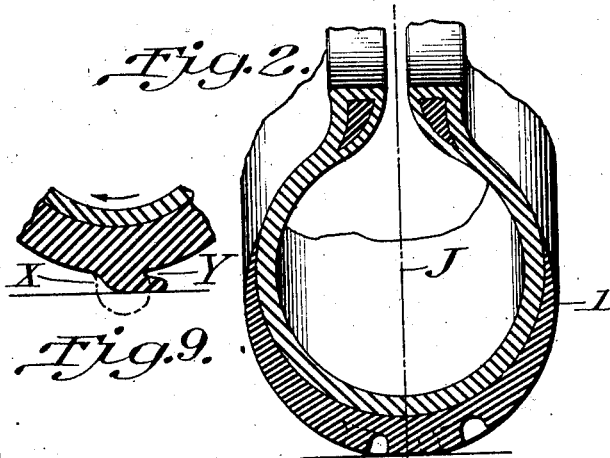
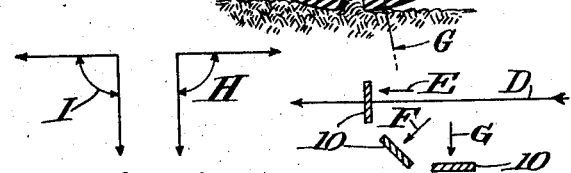
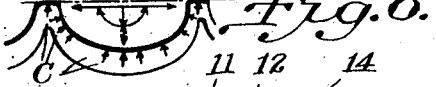
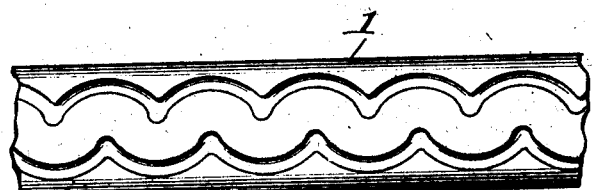
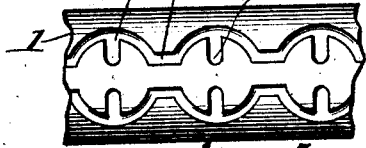

UNITED STATES PATENT OFFICE.

EDWARD F. EDGECOMBE, OF CUYAHOGA FALLS, OHIO.

TREAD FOR RESILIENT TIRES.

1,113,934.

Specification of Letters Patent.   Patented Oct. 13, 1914.

Application filed July 9, 1914.   Serial No. 849,945.

*To all whom it may concern:*

Be it known that I, EDWARD F. EDGECOMBE, a citizen of the United States, and a resident of the city of Cuyahoga Falls, in the county of Summit, State of Ohio, have invented certain new and useful Improvements in Treads for Resilient Tires, of which the following is a specification.

This invention relates to road vehicle tires and particularly to the formation of the tractive surface thereof.

The principal object of this invention is to produce a road vehicle tire having a smooth tread equipped with gripping facilities constructed to insure effective operation without inducing excessive wear either to the tire or the roadway.

A still further object of this invention is to produce a tire provided with grooves constructed in the face of the tire, on each side of the middle of the tread, and formed to present effective abutments at substantially right angles to any tractive forces set up due to propulsion, skidding, or braking efforts.

Still other and further objects of this invention will in part be obvious and will in part be pointed out in the specification by reference to the accompanying drawings, wherein like characters are used to represent like parts throughout the several figures thereof.

Figure 1 is a view showing a plan of a preferred form of tread according to my invention. Fig. 2 is a view showing a section on lines 2—2 Fig. 1. Fig. 3 is a view illustrating the effect of a tread built in accordance with my invention when the tire is rolled sidewise due to the momentum of the vehicle in rounding a curve. Fig. 4 is a view illustrating a slight modification of the preferred form of my invention. Fig. 5 is a view illustrating a further modification. Figs. 6 and 7 are diagrammatic views illustrating forces set up between the tread surface of a tire and the road surface. Fig. 8 is a detailed view illustrating lines of resistance established by the preferred form of the tread of the tire according to my invention. Fig. 9 is a detailed view illustrating the effect of a projection when the tire is under either braking or propelling stresses. Fig. 10 is a detailed view illustrating the effect of a groove in a tire when the tire is under either propelling or braking stresses.

In dealing with the problem of road vehicle resilient tires and particularly pneumatic tires for automobiles I have found that a groove, extending below the general surface of the tread proper and having substantially parallel side walls, is far more efficient and effective than is a ridge or projection extending above the general surface of the tire. Where the projection is small the wear upon the tread, or extending portion thereof, is excessive, the result being that the projection is soon destroyed. If a wheel be run over a roadway of soft or loose material the projection has a digging action which tends to dig up the roadway, and at the same time the projection presents only a very small effective abutment surface against which the propulsive forces may act. The ridge presents substantially the same condition as an isolated projection. In both cases the tractive forces are concentrated in the small mass of tire material forming the ridge or projection, which material is thereby stretched greatly upon one side and compressed greatly upon the other. For example, in Fig. 9, a portion of the projection, as at X, is under extreme tension while the portion of the projection, as at Y, is under heavy compression.

The conditions existing in connection with a groove having substantially vertical walls are quite different from those just described. In the first place, the walls of the groove are sustained by the main body of the tire and thereby are supported fully, either when under compression or under tension. In the second place, the weight of the vehicle upon the tread face has a tendency to curve the edges of the groove toward each other and when this weight is combined with tractive effort the side of the groove, sustaining the active tractive forces, is substantially at right angles to the force acting against the groove, as is illustrated in Fig. 10.

The tire art is filled with various forms of tread surfaces, including both projections and grooves. It is common in the art to run a projection or groove entirely across the normal surface of the tire, that is, across the median line or crown of the tire. In each case where the crown of the tire is crossed, either by a ridge or by a groove, the circular continuity of the crown is broken by a short chord. These short chords produce an irregular vibration when the tire is moving over the road surface at a high speed, which vibration tends both to heat and destroy the tire, to cause vibration of the vehicle and to destroy the road surface.

When a vehicle is rounding a curve there is always a tendency for the body of the vehicle to continue in a straight line, due to Newton's law of motion, and this tendency must be overcome by resistance between the tire and the road surface, otherwise, the vehicle will skid. Numerous devices have been designed with the object of meeting this requirement and it is usual to arrange these devices on the middle or tread portion of the tire. It will be seen, however, that when a pneumatic or resilient tire is sustaining side pressure, the tire has a tendency to roll. Under such conditions the crown of the tire ceases to be the active portion and it is the part to the side of the crown of the tire that is in most intimate contact with the road surface. It has also been common in the art to provide the tread with small cups or pockets which tend to form vacuums when the tire is run over a smooth road surface. The intention being to obtain a grip or hold by the tire upon the road surface. It will be seen that while such devices tend to maintain the tire in close contact with the surface, they also tend to subject that portion of the tire to an excessive and unusual pressure and they furthermore pick up or stir up all the loose particles on the road surface within the zone of action of the tire.

I have found, and from the foregoing statements it will be noted, that an effective tire can best be constructed wherein the normal tread thereof is smooth and wherein gripping devices are constructed which will present effective abutments at right angles to any and all forces which may be set up between the tire and the road surface. Furthermore, that the effective abutment be one wall of a groove, which wall is supported by the main body of the tire and which groove is so constructed as to prevent the formation of vacuums.

Referring now to the drawings and more particularly to Figs. 1 and 2, it will be noted that my invention includes a vehicle tire 1 having the crown thereof, as between the lines A and B, formed with a smooth continuous surface. Continuous grooves 2 and 4 are provided in the tire on each side of the crown portion. The walls of these continuous grooves 2 and 4 are preferably perpendicular when in the normal state. The grooves 2 and 4 are congruous, that is, they are similar with the exception that the contour of the groove 2 is reversed with reference to the contour of the groove 4. Each groove comprises a plurality of curved parts which include short portions 5 extending adjacent to and substantially parallel with the center portion of the crown of the tire. From the portion 5 the groove recedes rapidly and extends at substantially right angles to the crown portion of the tire, as at 6. The groove then curves rapidly as at 7 and again becomes substantially parallel to the crown portion, as at 8, and it will be noted that this portion of the groove is farthest away from the center or crown of the tire. The entire contour of the preferred form is but a repetition of the immediate foregoing description, and as will be seen comprises a series of continuous arches. Furthermore the side walls of the grooves, constitute abutments which are below the wear surface of the tire and are supported by the body of the tire. The facing of the tread portion of the part lying between the continuous grooves 2 and 4 comprises a strip of material having substantially the same amount of supporting surface on each side of the crown of the tire and is continuous so as to present no short chords when the tread is in action.

Figs. 6 and 8 diagrammatically illustrate forces that may act on one side of the tire. The arrow D in Fig. 6 indicates the travel of the vehicle. The arrow E indicates the direction of force with reference to the tire if the brakes be set. If the vehicle at the same time be rounding a curve there is a tendency to skid and the force may be a resultant between the braking and the skidding forces. In that case the force would be in the direction of the arrow F. If the vehicle be turned sufficiently in rounding a curve it may be sufficient to act on certain tires at right angles, as represented by the arrow G. The device 10 indicates abutments, such as the side walls of grooves, to resist the forces indicated by the arrows. Referring now to Fig. 7 it will be noted that one side of the tire, when under propelling action, may withstand forces in any direction within 90 degrees, as indicated by arrows H. It will also be noted by referring to the arrows I in this same figure, that when the vehicle is being propelled through the tire, the tire may receive and sustain any force through the complementary 90 degrees. It is to be understood that these diagrams represent but one-half of the possible forces. The corresponding half will include the complementary 180 degrees.

Fig. 8 illustrates by the arrow C, that the groove is of such contour as to present surfaces to meet any force within the range of 180 degrees. The oppositely formed groove on the other side of the crown, being identical, presents abutments to resist forces coming in any direction through the scope of the complementary 180 degrees. Therefore it will be seen that by reference to Figs.

1 and 8 that a tread formed according to my preferred construction will take up and resist any force between the surface of the tire and the roadway, resulting from tractive or skidding efforts.

Fig. 3 illustrates the action of a tire under a force in the direction opposite to the arrow G in Fig. 6. It will be noted that the tire is rolled so that the central line J is displaced from the vertical, and the side of the tire is now the effective portion to resist forces tending to cause the vehicle to skid. When the tire is in this position substantially the whole side wall of the groove resists the skidding effort, yet at the same time a very effective driving or braking grip is effected by the portions of the walls of the groove which are at right angles to the drive of the tire.

Fig. 4 is a very slight modification of my invention showing the tread constructed with flatter curves to present more abutting surface against skidding forces.

Fig. 5 is a further modification which includes a groove having parts parallel to the crown portion and also other parts at directly right angles thereto. In this modification the arches 11 are illustrated as being formed upon segments of circles, and the feet of the arches 12 comprise short lines substantially parallel to the middle line of the crown of the tire. Depending from the center of the arches are short grooves 14 which extend at right angles to the middle line of the crown of the tire and the edges of these grooves 14 are therefore at right angles to tractive forces parallel to the middle line of the tire.

Having thus described my invention what I desire to claim is:

1. A resilient tire having a tread including, a continuous unbroken crown, continuous abutments comprising the walls of continuous grooves located on each side of said crown, said abutments being curved and having portions adjacent said crown and substantially parallel to the center line of the tire, said abutments then extending rapidly away from the center line of the tire and having a tangent at substantially right angles thereto, said abutment continuing in a curved line so that the portion of said abutment farthest from the center line of said tire has a tangent substantially parallel to the center line of said tire.

2. A resilient tire provided with a tread comprising a continuous unbroken crown, abutments on each side of said crown, said abutments comprising the side walls of grooves formed in the body of said tire, said abutments comprising a continuous series of flat arches joined at their feet and arranged with the middle of the arch farthest from the center line of the tire, substantially as described.

3. A resilient tire including a body portion, a tread formed upon said body portion, said tread including a continuous unbroken crown forming the middle of the tread, a pair of congruous abutments on each side of said crown, said abutments comprising the side walls of grooves formed below the wear surface of said tire, said grooves being continuous and comprising a series of connected arches having the foot of each arch toward the middle of the tire and the bow of the arch beyond the normal tread and parallel thereto.

4. A resilient tire comprising in combination a body portion, a tread formed upon said body portion, said tread having a substantially continuous crown portion including the center line of the tire, continuous abutments on each side of said crown portion, said continuous abutments comprising walls of continuous grooves, the walls of each groove being substantially parallel on a cross section thereof, said abutments comprising a series of continuous flat arches having the feet of the arches nearest the center of the tire and the bows of the arches farthest from the center of said tire, the feet of the arches of the groove on one side of said crown being arranged opposite the bows of the arches of the groove on the opposite side of the crown.

5. A resilient tire including a body portion, a tread formed upon said body portion, said tread including a continuous crown, a continuous abutment formed on said body portion and below the wear surface thereof, said abutment being curved in such a manner as to present a surface having a tangent at right angles to any tractive force delivered against said abutment in any direction on one side of the center line of said tire.

EDWARD F. EDGECOMBE.

Witnesses:
 HARRY A. EDGECOMBE,
 EMORY A. PRIOR.